United States Patent [19]
Phipps et al.

[11] Patent Number: 5,233,528
[45] Date of Patent: Aug. 3, 1993

[54] BRAKING BY DECELERATION CONTROL

[75] Inventors: Jack R. Phipps, Novi; Douglas R. Verner, Sterling Hgts., both of Mich.

[73] Assignee: Allied-Signal Inc., Morristown, N.J.

[21] Appl. No.: 692,104

[22] Filed: Apr. 26, 1991

[51] Int. Cl.$^5$ ............................................. B60T 8/32
[52] U.S. Cl. .............................. 364/426.02; 303/100; 303/103
[58] Field of Search ............... 364/426.02, 426.03; 180/197; 303/95, 99, 100, 103, 105, 109

[56] References Cited

U.S. PATENT DOCUMENTS

| | | | |
|---|---|---|---|
| 4,610,484 | 9/1986 | Amberg et al. | 303/100 |
| 4,917,444 | 4/1990 | Ishido et al. | 303/100 |
| 4,933,856 | 6/1990 | Leiber | 303/100 |
| 4,938,544 | 7/1990 | Braschel et al. | 364/426.02 |
| 5,019,984 | 5/1991 | Masaki et al. | 364/426.02 |
| 5,117,361 | 5/1992 | Takayama et al. | 364/426.02 |
| 5,134,352 | 7/1992 | Matsumoto et al. | 364/426.02 |
| 5,140,524 | 8/1992 | Matsuda | 364/426.02 |

FOREIGN PATENT DOCUMENTS

| | | |
|---|---|---|
| 0039602 | 11/1981 | European Pat. Off. |
| 0288846 | 11/1988 | European Pat. Off. |
| 3722107 | 1/1988 | Fed. Rep. of Germany |
| 2147258 | 3/1973 | France |
| 2127505 | 4/1984 | United Kingdom |

Primary Examiner—Gary Chin
Attorney, Agent, or Firm—Markell Seitzman

[57] ABSTRACT

A method of controlling the braking behavior of various wheels of a vehicle during a normal braking mode of operation and during an antilock braking mode of operation, the method using a control unit which calculates various parameters over a known time increment $(t-t_1)$ the method including the steps of: obtaining a value of the actual rotational velocity of each wheel $(W_1, W_2)$; generating a first signal indicative of braking effort P(in) or desired vehicle deceleration; generating a per wheel velocity command signal the slope or deceleration of which is proportional to the desired vehicle deceleration p(in) and a multiplicative scale factor $(ABSG_i + G_j)$ for adjusting such deceleration during the normal braking mode and antilock braking mode, generating a per wheel error signal $E_i$ as a difference between the wheel velocity command and actual rotational velocity of each wheel; operating upon the error signal $E_i$ to generate a brake activity command signal $B_i$, regulating brake force in response to the brake activity command signal $B_i$.

10 Claims, 2 Drawing Sheets

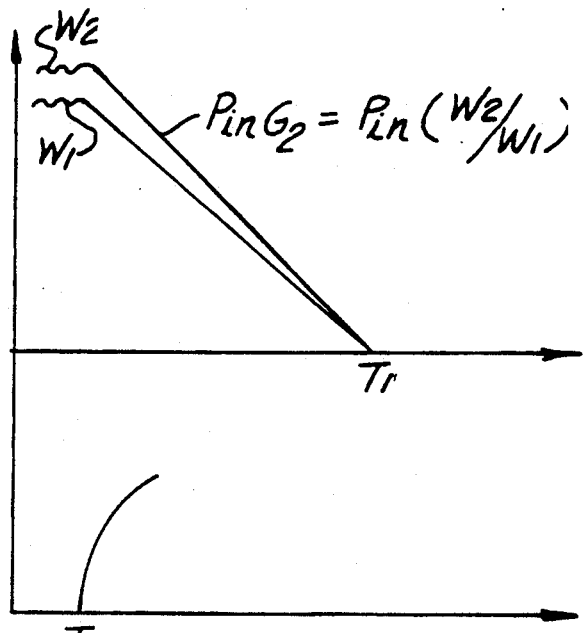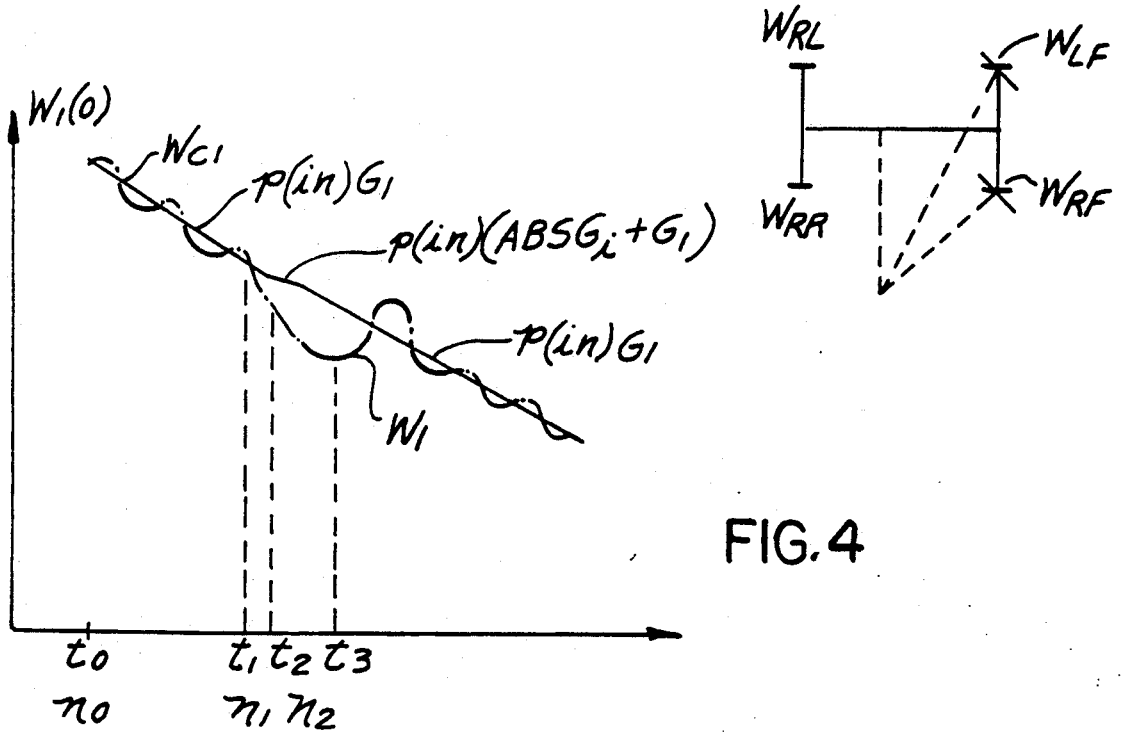

BRAKING BY DECELERATION CONTROL

BACKGROUND AND SUMMARY OF THE INVENTION

The present invention relates to a system for controlling the braking of a vehicle.

In conventional braking systems, a pressure is applied to each brake unit; the braking torque generated from the pressure acting on a piston (or pistons) forces some friction material to act on a rotating element (usually a drum or a disk). The same pressure is normally applied to both wheels of an axle. Frequently to prevent vehicle instability due to locking of the rear wheels before lockup of the front wheels, a proportioning valve (or valves) modulates the rear wheel brake pressure. Sometimes an adjustable proportioning valve, sensitive to vehicle spring deflection, is used which attempts to maintain proper brake balance. The adjustment rebalances the brakes (front to rear) as a result of changes in vehicle loading.

The usual (conventional) approach has some shortcomings. The coefficient of friction between the brake pads/shoes and the rotating element is not uniform. In high-volume production, the coefficient of friction may vary significantly batch to batch. Allowances are made for this variation, to insure that the rear wheels do not lock prematurely, causing vehicle instability. This "safety margin" results in less than best brake balance. Furthermore, the usual brake balancing schemes assume a nominal friction coefficient of friction of the brake pads and linings and also assume that the reaction torque at the tire/road interface is consistently related to brake torque. This is not always true since if the tire size (rolling radius) changes appreciably, the lever arm, through which the torque acts, will also change.

These shortcomings result in compromises in brake effectiveness, and can cause uneven wear of tires, brake linings, etc. A cost penalty, as well as some degradation in reliability, results from the addition of a load-sensing or a deceleration sensing proportioning valve to adjust the rear braking pressure as a function of the front braking pressure.

Although not a functional element, the subjective reaction of drivers to the perception of force required versus pedal travel, is limited by the need to provide enough fluid displacement to place the brake shoes/pads in contact with the drum/rotor. Pedal travel is dependent on the compliance of a brake and is also affected by any air entrained in the brake hydraulic fluid. The above factors determine the stroke of the master cylinder and therefore the stroke brake pedal. Geometry of the pedal/master cylinder combination can be varied within limits, but for ease of use, excessive travel of the pedal cannot be accommodated. Further, to develop the pedal force required to produce a pressure adequate to stop the vehicle under worst-case conditions, there are other constraints based on physical limitations of the operator.

The present invention is directed to a substantially improved method of regulating the braking effort at the individual wheels, which obviates most or all of the deficiencies noted above.

Specifically, the invention describes a method of regulating the rate of change of velocity (deceleration) of each wheel, based on a deceleration command generated by the operator. The invention envisions an electrically controlled braking system, where the input is an electrical signal derived by any of several sensing processes. The input signal is then examined by a microcontroller, and the appropriate braking activity at each wheel produced.

It is an object of the present invention to provide a braking system in which an allowance is made for differing wheel speeds when negotiating a bend or a corner. A further object of the present invention is to provide a braking system which accommodates the use of different sized tires such as resulting from the use of a temporary spare tire, the use of a severely deflated tire, or the replacement of a previously worn tire with a new one. A further object of the present invention is to provide for antilock braking control with no additional hardware and as such, to provide a cost effective braking system.

Accordingly, the invention comprises: a method of controlling the braking behavior of various wheels of a vehicle during a normal braking mode of operation and during an antilock braking mode of operation. The method uses a control unit or microcontroller which calculates various parameters over a known time or sampling increment. The method including the steps of:

1.1 obtaining a value of the actual rotational velocity of each wheel ($W_1, W_2$);

1.2 generating a first signal indicative of braking effort $P(in)$ or desired vehicle deceleration;

1.3 generating a per wheel velocity command signal the slope or deceleration of which is proportional to the desired vehicle deceleration $p(in)$ and a multiplicative scale factor ($ABSG_i + G_i$) for adjusting such deceleration during the normal braking mode and antilock braking mode, 1.4 generating a per wheel error signal $E_i$ as a difference between the wheel velocity command and actual rotational velocity of each wheel, 1.5 operating upon the error signal $E_i$ to generate a brake activity command signal $B_i$, 1.6 regulating brake force in response to the brake activity command signal $B_i$.

Many other objects and purposes of the invention will be clear from the following detailed description of the drawings.

BRIEF DESCRIPTION OF THE DRAWINGS

In the drawings:

FIG. 2 diagramatically illustrates a four wheel vehicle.

FIG. 3 illustrates a deceleration command curve.

FIG. 4 shows a time history of wheel velocity versus time.

DETAILED DESCRIPTION OF THE DRAWINGS

Figure 1:
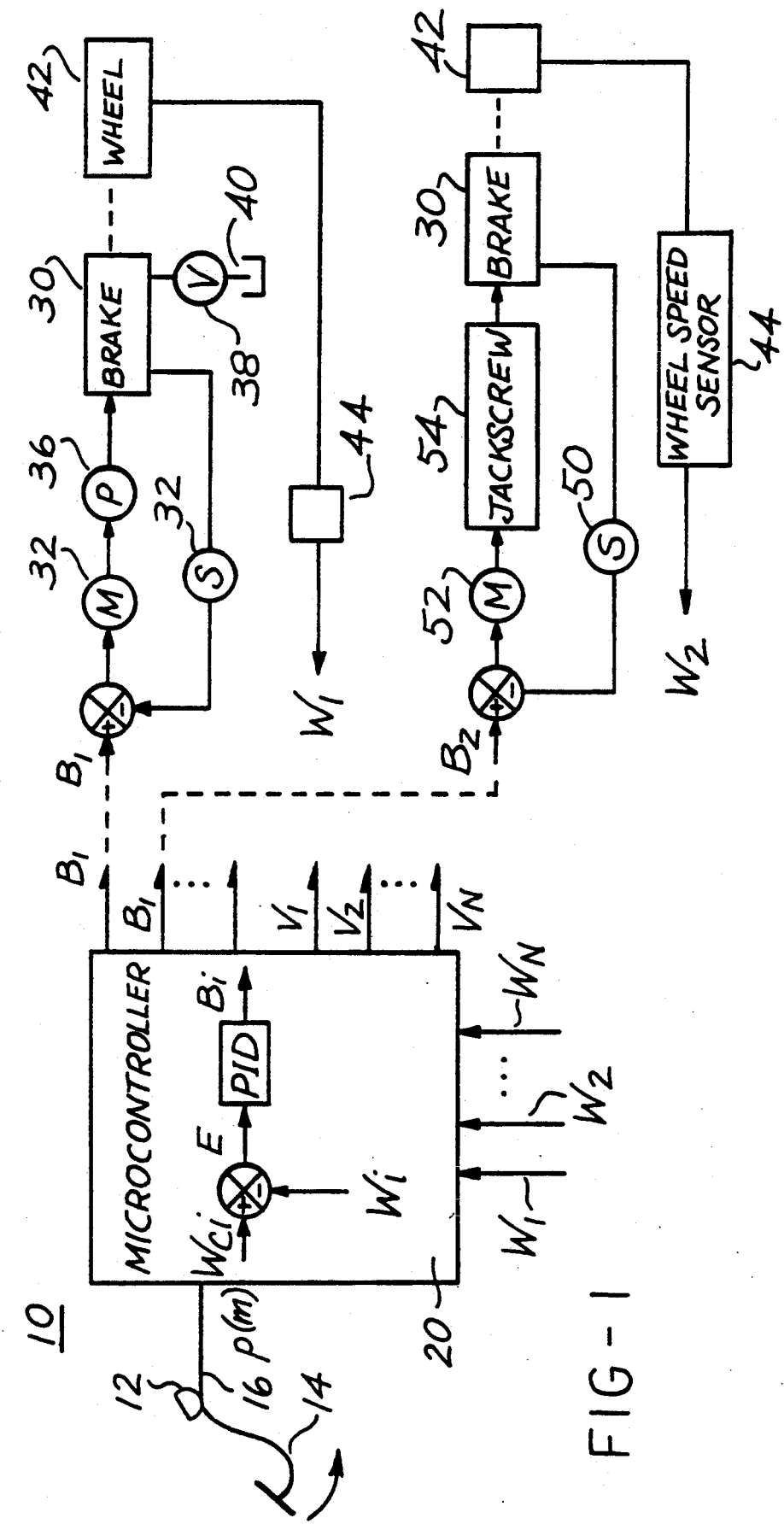
FIG. 1 diagramatically illustrates a brake control system incorporating the present invention.

As mentioned above, the present invention utilizes an input signal which is examined by a microcontroller to generate a signal indicative of braking activity. Reference is briefly made to FIG. 1 which diagramatically illustrates the braking system 10 incorporating the teachings of the present invention. There is shown a pedal force sensor 12 for measuring the operator applied braking force as the operator presses upon a brake pedal 14. The output of the sensor 12 diagramatically shown on line 16 is a pedal force input signal $p(in)$. As can be appreciated, the units of the $p(in)$ signal may be in volts per unit of applied braking force. This input signal is received by the microcontroller 20 which also receives as input signals additional system parameters and constants to generate a plurality of braking activity signals generally shown as $B_i$. In the present invention the pedal force input signal is sealed within the microcontroller 20 to yield a nominal deceleration command signal which is also referred to as p(in). This deceleration command signal is appropriately adjusted for various scale factors to generate a plurality of wheel deceleration command signals as described below.

If, for example, the brake mechanism 30 is a hydraulic brake, the brake activity signal $B_i$ may be used to control the level of hydraulic pressure within the brake 30. FIG. 1 diagramatically illustrates one method of achieving this control wherein the actual brake pressure is measured by a pressure sensor 32, the output of which is combined with the brake activity signal such as $B_1$ which would be a pressure command signal, to generate a pressure error signal which is communicated to a motor 34, which in turn rotates a pump 36 to pressurize the brake line. Pressure decay within the brake 30 may be achieved by opening an electrically responsive valve 38 in response to a valve activation signal $V_i$ (i=1,2--n) to return brake fluid to the sump 40 of the pump 36. The brake 30 operates directly on a wheel 42, wheel speed $W_i$ is sensed by a wheel speed sensor 44, the output of which is communicated to the microcontroller 20. FIG. 1 also illustrates another method of brake activation utilizing an electrically controlled brake 30 wherein the brake activation signal, such as for example, $B_2$ is combined with a sensor 50 to generate an error signal causing a motor 52 to move a jack screw 54 thereby urging the friction material against the disk or drum. The applied braking force on the brake 30 is sensed by sensor 50 which can be implemented in many ways such as a torque sensor, a position sensor measuring the number of turns of the motor, or a current sensor measuring motor current which is indicative of developed motor torque. As before, a wheel speed sensor such as 44 is used to generate a signal indicative of the speed of the wheel 42 which is communicated to the microcontroller 20.

In view of the above, the invention contemplates obtaining a value indicative of the actual rotational velocity of each wheel of a vehicle. This is accomplished as the microcontroller 20 interrogates the various wheel speed sensor input signals $W_i$.

Reference is briefly made to FIG. 2 which diagramatically illustrates a vehicle having four wheels. As will be seen from the description below, the present invention operates on sets of wheel speed information. In the preferred embodiment of the invention, the microcontroller 20 defines the front wheel rotational velocities ($W_{FR}$, $W_{FL}$) as a first set of input parameters and the rear wheel velocities ($W_{RR}$, $W_{RL}$) as a second independent set of input parameters. It should be appreciated that the sets of input parameters can also be defined in a split manner, that is, one set utilizing the front left wheel velocity WRR and rear right velocity $W_{FL}$, while the other set using the front right velocity $W_{FR}$ and rear left velocity $W_{RL}$. The microcontroller operates on each set of velocities identically. In the preferred embodiment of the invention, the wheel velocities for an exemplary set of such wheel velocities will be described as $W_1$ and $W_2$.

The microcontroller identifies a command wheel velocity signal for each wheel in the set. If, for example, the microcontroller is implemented to keep track of the time variable t, each wheel velocity command signal $W_{ci}$ would be defined by equation 1.

$$W_{ci}(t) = W_i(t) - p(in)*(ABSG_i + G_i)t \quad (1)$$

wherein $W_{ci}(t)$ is the wheel velocity signal at time t for the ith wheel, i=1,2, $W_i(t)$ is the actual rotational velocity of the ith wheel, p(in) is a parameter or signal indicative of braking effort scaled approximately as a deceleration. This parameter may be viewed as a nominal deceleration command signal.

The combination scale factor $(ABSG_i + G_i)$ scales the nominal deceleration command signal to achieve a per wheel deceleration command $p(in)(ABSG_i + G_i)$ for each wheel. $ABSG_i$ is a variable gain factor increment used to adjust the rate of change or deceleration of the wheel velocity command signal during the antilock braking mode of operation. The parameter $ABSG_i$ is defined as zero when the braking system 10 is in its normal braking mode of operation. The parameter $G_i$ is an additional gain factor used to adjust the rate of change or deceleration of the vehicle command signal during the normal braking mode of operation (straight ahead braking or braking in a turn).

In the preferred embodiment of the invention the microcontroller 20 is a sampled data device which samples various input parameters at sampling increments n, n+1, n+2, etc. and generates a corresponding plurality of signals. The wheel velocity command signals shown in FIG. 1 can be implemented in such microcontroller 20 by utilizing equations 2 and 3.

$$W_{ci}(O) = W_i(O) \quad (2)$$

$$W_{ci}(n) = +p(in)*(ABSG_i + G_i) + W_{ci}(n-1) \quad (3)$$

With regard to equation 2, the variable $W_{ci}(O)$ is the initialized value of the ith wheel velocity command signal which is initialized to the value of the initial measured velocity of the ith wheel, i.e., $W_i(O)$ each time the pedal is depressed. Thereafter, the wheel velocity command signal at any sample period n is given by equation 3 which may be generated within a register within the microcontroller 20 in a known manner. Thereafter and as diagramatically illustrated in FIG. 1, an error signal E is generated for each wheel (i=1,2) for each set of wheel velocity parameters in accordance with equation 4.

$$E_i(n) = W_{ci}(n) - W_i(n) \quad (4)$$

A braking activity signal $B_i$ as mentioned above, is generated for each wheel. This signal may be thought of as a brake force command, brake torque command, pressure command, etc. Some appropriate scaling may be required. In the preferred embodiment of the invention, the braking activity signal $B_i$ is obtained by operating on the error signal associated with each wheel, by a proportional, integral, differential controller (PID) which is diagramatically shown by equation 5.

$$B_i = [PID\ CONTROLLER] \times E_i(n) \quad (5)$$

More specifically, the actual brake activity signal $B_i$ as a result of the use of the PID controller is implemented utilizing the scheme shown in equations 6a and 6b wherein PK, DK and IK are constants of proportionality respectively associated with a term proportional to the error signal, its derivative and summation or integral value.

$$B_i = E_i(n)*PK + [E_i(n) - E_i(n-1)]*DK + E_i(n)*IK \qquad (6a)$$

$$B_i = [W_{ci}(n) - W_i(n)]*PK + [W_{ci}(n-1) - W_i(n-1)]*DK + [E(n)]*IK \qquad (6b)$$

Reference is made to FIG. 3 which shows a stop action moment in time and illustrates a situation where the wheel velocities of one of the sets of wheels ($W_1$, $W_2$) are different. This figure will be useful in illustrating how the gain factor $G_i$ is obtained for straight line braking. It also illustrates how the present invention allows for the differing wheel speeds resulting from different sized tires and will also be useful in illustrating in how the present invention allows for differing wheel speeds when negotiating a bend or corner during normal braking operation. For whatever reason, at time T0, the wheel speeds $W_1$ and $W_2$ are of differing rates. The present invention envisions that the microcontroller 20, upon receipt of a brake activation signal (at time T0), will interrogate the wheel speed velocities $W_1$ and $W_2$. Thereafter the microcontroller will generate the gain factor $G_i$ associated with each wheel to appropriately adjust the deceleration (slope of the wheel velocity command) of each wheel such that each wheel will reach zero speed simultaneously. Returning to equation 3, and assuming for the moment that the gain factor $ABSG_i$ is zero, that is none of the wheels are in the antilock mode of operation, and recalling that the command signal p(in) is a braking effort signal scaled in terms of deceleration which would yield a desired nominal deceleration of the vehicle. In view of the above the microcontroller 20 will extrapolate the wheel speeds from the initial stored velocities $W_i(0)$ to zero speed in the following manner. With regard to the wheel exhibiting the slowest rotational wheel velocity at time T0 the microcontroller 20 will extrapolate or decrement the initial wheel speed velocity of the slowest wheel $W_1(0)$ to zero at a rate which is generally equal to p(in)$\times$G1 wherein G1 for the slowest wheel is equal to a constant K1. In the preferred embodiment of the invention the constant K1 is equal to 1. This extrapolation to zero at the above constant deceleration rate of p(in)$\times$G1 is shown in FIG. 3. Thereafter the microcontroller determines a preferred deceleration rate for the higher rotating wheel, i.e., $W_2$, such that its velocity would reach zero speed simultaneously with that of the extrapolated value for $W_1$. The adjusted deceleration rate for the higher speed wheel $W_2$ is also diagramatically shown in FIG. 3 as p(in) $G_2$. The above adjustment in the deceleration can be accomplished in a straightforward manner by permitting the gain factor G2 to be equal to $$G2 = [W_2(O)/W_1(O)]*G_1 \qquad (7)$$

These gain factors are recalculated each time the pedal is depressed. In view of the above, the microcontroller has now established the command rate at which any particular wheel should decelerate during the normal braking mode of operation, this value being equal to p(in)*$G_i$.

Consider the dynamics of braking which occurs in a conventional hydraulically braked vehicle as the vehicle is negotiating a turn. When a vehicle is in a turn, the outside wheel, for example the left front wheel, of FIG. 2, will rotate faster than the right front wheel. In addition because of the vehicle's weight transfer during the turn, the left front brake will typically be capable of generating a greater braking force at the tire/road interface than will the right front brake. This imbalance in braking forces may ultimately tend to destabilize the vehicle during an aggressive turn or accident avoidance maneuver. It is a design goal to achieve a brake system that yields a balance between the right and left hand braking forces while the vehicle is in a turn. This goal, however, is not often realized. This deficiency is addressed and solved by the present invention in the following manner. The microcontroller 20 first determines an index relating to the brake balance between for example the front left and front right wheels. If this index is greater than a threshold value, corrective action is taken to correct the brake balance. This is accomplished by determining an index value which is equal to the absolute difference between the right and left side brake activity commands in accordance with equation 8 below.

$$|B_1 - B_1| > B_T \qquad (8)$$

wherein $B_1$ is the brake activity signal associated with one wheel, $B_2$ the brake activity associated with a second wheel and $B_T$ a threshold value. While the brake activity command signals $B_i$ have been used in equation 8, it should be apparent that a measure of the brake activity, brake force, brake application, etc., can also be achieved by measuring the actual developed pressure in a hydraulic system or alternatively if an electrically braked system were used, the measurement of motor current, brake torque, etc., alternatively the position of the jack screw 34, can be used.

If the absolute value of the differences in the brake activity signals as defined in equation 8 is less than the threshold value $B_T$, then one can assume the wheels are essentially operating in a balanced brake mode of operation. Further, if one is attempting to maintain a left/right brake balance in the vehicle during a turning maneuver, then one needs information to indicate to the microcontroller 20 that the vehicle has in fact begun such a turning maneuver. It is not desirable to monitor the position of the steering wheel or the tires themselves since this requires additional sensors and electronics, resulting in an increased cost of the system. In the present invention, however, the initiation of a turn is obtained implicitly by monitoring the brake activity command signals $B_i$ (or alternatively any of the above mentioned feedback signals: pressure, position, torque, current, etc.). If the brake activity command such as $B_1$ of one wheel is increasing and if the brake activity command of the other wheel such as $B_2$ is decreasing as it normally will during a turning maneuver, then the gain factor $G_i$ associated with each wheel will be modified to adjust the commanded deceleration (p(in)$G_i$) of that wheel. More specifically, the gain factor $G_i$ associated with the wheel having a decreasing brake actuator command $B_i$ is incremented while the gain factor associated with the wheel exhibiting an increasing brake activity command is decremented. This process is shown below in equation 9.

$$G_i(n) = G_i(n-1)*K + G_i(n-1) \qquad (9)$$

wherein $G_i(n)$ is the current gain factor, $G_i(n-1)$ is the old value of the gain factor and K is a constant of proportionality or an incremental index which will be a positive and negative value as the case may be. If K is a positive value then the appropriate gain factor $G_i$ will increase or be incremented and if K is a negative quantity then the gain factor $G_i$ will be decremented. As can be appreciated, by modifying the gain factor $G_i$ of the appropriate wheel, its desired rate of change or deceleration $p(in)*G_i$ will appropriately increase or decrease, thereby resulting in a relative increase or decrease in the brake activity signal which will ultimately yield a more balanced braking condition while negotiating a turn.

Reference is made to FIG. 4 which illustrates the wheel velocity command signal WC1 (in solid line) and actual wheel speed (in fragmented line). As can be seen from this figure, the slope or commanded deceleration of the wheel velocity reference signal is $p(in)G1$. During normal brake operation it is anticipated that the actual wheel speed will only deviate marginally from the commanded velocity.

Having determined the gain factor indices $G_i$ which essentially define the desired or recommended rate of change or decleration of each wheel during straightline braking and during a turning maneuver, it is now desirable to determine whether or not any particular wheel should be under antilock control. This is done by determining whether the deceleration $a_i$ of any wheel has exceeded its desired commanded deceleration by a given increment or threshold $ABST_i$ as shown in equation 10.

$$A_1 > G_i*p(in)*k_2 = G_i \times K_2 = ABST_i \quad (10)$$

wherein $k_2$ is a scale factor greater than 1 and $K_2$ equals the product of the brake effort or deceleration command $p(in) \times$ constant $k_2$. $k_2$ is typically in the range of 1.05 to 1.1.

In a microcontroller which calculates the various parameters over a known sampling increment, a value of the actual wheel acceleration $a_i$ can be obtained from a comparison of wheel velocity signals as generated by the wheel speed sensor 44 as shown in equation 11.

$$a_i = W_i(n) - W_i(n-1) \quad (11)$$

Reference is again made to FIG. 4 which shows one of the wheels entering a skid condition. On inspection of the wheel velocity curve $W_1$, one can see that the actual deceleration of this curve exceeds the desired deceleration $p(in)*G_1$ by an amount for the purpose of illustration, which is greater than the deceleration threshold value $ABST_1$. This situation is indicative of the fact that the commanded brake activity command for this particular wheel is greater than the forces which can be generated at the tire/road interface causing an increased deceleration (negative acceleration) of the wheel in excess of the desired or commanded value. In this condition the wheel is tending toward lock-up. To bring this wheel under control it is desirable to decrease the brake actuation or activity force. This is done by commanding a less aggressive deceleration command for that particular wheel. This is accomplished in concert with equation 3 by modifying the gain factor $ABSG_i$ to decrease the slope of the commanded deceleration. This is achieved by generating a recurring index within the microcontroller in accordance with equation 12 as shown below:

$$ABSG_i(n) = a_i + ABSG_i(n-1) \quad (12)$$

wherein $ABSG_i(n)$ is the new value of this parameter and $ABSG_i(n-1)$ is the prior or old value of this parameter. As can be seen from FIG. 4 and equation 12 with the wheel decelerating rapidly, the new value of the gain factor $ABSG_i(n)$ will be a quantity which when added to the gain factor term $G_i$ will decrease the slope of the commanded deceleration as shown in the interval subsequent to time t2 or sampling event n2. As such it can be seen that the commanded change in velocity of the wheel or its commanded deceleration has decreased (the slope of the curve has decreased) which in turn will cause for a smaller brake activity command $B_i$ or reduced the brake activity or brake force applied to the brake 30. Subsequently, the wheel will begin to accelerate at some point in time such as t3 after the braking forces on the wheel have been sufficiently reduced. When the indexed value $ABSG_i(n)$ is again zero the normal braking mode of operation is entered and the factor $ABSG_i$ is maintained at zero until it is determined that the actual wheel deceleration exceeds the threshold value as described above whereupon the antilock lock mode of operations is again entered.

As can be seen, the antilock behavior of any particular wheel has been altered by modifying the reference deceleration command to a value less than that which would be commanded by the operator. Subsequently, the brake activity force is modified to allow the previously skidding wheel to reaccelerate to a speed nearly synchronous with that of the vehicle speed.

In view of the above, it can bee seen that the present invention provides for an automatic proportioning, that is each wheel will automatically do its share of braking. The proportioning achieved by the present invention is independent of vehicle loading or load distribution. Control of any of the wheels in an antilock braking mode of application is implemented with minimal additional cost.

Many changes and modifications in the above described embodiment of the invention can, of course, be carried out without departing from the scope thereof. Accordingly, that scope is intended to be limited only by the scope of the appended claims.

We claim:

1. A method of controlling the braking behavior or various wheels of a vehicle during a normal braking mode of operation and during an antilock braking mode of operation, the method using a control unit which calculates various parameters over a known time increment $(t-t_1)$ or $\Delta t$ which can be considered as a known time based scale factor, the method including the steps of:

1.1 obtaining a value of the actual rotational velocity of each wheel ($W_1$, $W_2$);
  1.2 generating a first signal indicative of braking effort P(in) or desired vehicle deceleration;
  1.3 generating a per wheel velocity command signal the slope or deceleration of which is proportional to the desired vehicle deceleration p(in) and a multiplicative scale factor ($ABSG_i + G_i$) for adjusting said desired vehicle deceleration during the normal braking mode and antilock braking mode,
  1.4 generating a per wheel error signal Ei as a difference between the wheel velocity command signal and said actual rotational velocity of each wheel, 1.5 operating upon the error signal Ei to generate a brake activity command signal $B_b$, 1.6 regulating brake force in response to the brake activity command signal $B_i$.

2. The method as defined in claim 1 wherein the step 1.3 includes 2.1 generating the wheel velocity reference command signal in accordance with the following $W_{ci}(O) = W_i(O)$ and $W_{ci}(n) = + p(in)*(ABSG_i + G_i) + (n-1)$ wherein $ABSG_i$ is a variable gain factor increment, associated with an ith wheel, $i-1,2\ldots$, to define the rate of change of deceleration of the velocity command signal during antilock braking and has a value of zero when in normal braking, $W_i(O)$ is the initial measured wheel velocity of the ith wheel, $W_{ci}(O)$ is the initialized wheel velocity command signal of the ith wheel and $G_i$ is a gain factor used to define the rate of change of deceleration of the velocity command signal during normal braking, $W_{ci}(n)$ is the wheel velocity command signal at sample n.

3. The method as defined in claim 2 wherein the step 2.1 includes:

3.1 determining said initial value of wheel velocity $W_i(O)$ for each wheel corresponding to the beginning of the first signal p(in), 3.2 extrapolating the initial wheel velocity of each wheel from the initial value $W_i(O)$ to zero speed ($W_i = O$) such that the extrapolated values reach zero speed simultaneously to determine the respective gain factor Gi for each wheel.

4. The method as defined in claim 3 wherein the step 3.2 includes defining the gain factors Gi, Ii=1,2), wherein $G_1$ equals k and $G_2$ equals $(W_2(O)/W_1(O))G_1$ and wherein $W_2(O)$ and $W_1(O)$ are the respective initial wheel velocities of a set of wheels, $G_1$ and $G_2$ are respective gain factors associated with a slower and a faster one of the wheels, k is a scale factor associated with the gain factor $G_1$.

5. The method as defined in claim 4 wherein k is a constant and equals 1.

6. The method as defined in claim 1 including the steps of:

6.1 varying the brake actuation command to adjust the side to side braking balance when the vehicle is negotiating a turn, wherein step 6.1 includes the steps of:

6.1.1 monitoring the brake actuator command Bi for opposing wheels;

6.1.2 determining if the absolute value of the difference in the per wheel brake actuator commands $B_1$, $B_2$ is greater than a threshold value $B_T$;

6.1.3 determining if the brake actuator command $B_1$ for one wheel is increasing and if the brake actuator command $B_2$ for the other wheel is decreasing;

6.1.4 if the conditions in step 6.1.2 and 6.1.3 are satisfied, incrementing the gain factor $G_i$ associated with the wheel having a decreasing brake actuator command $B_i$ and decrementing the gain factor $G_i$ associated with the wheel having an increasing brake actuator command Bi.

7. The method as defined in claim 6 wherein the gain factor $G_i$ is incremented or decremented by the same amount.

8. The method as defined in claim 1 including the step of 8.1 determining whether or not any particular wheel should be under antilock control by determining if its actual wheel deceleration $a_i$ has exceeded the desired deceleration of the wheel velocity command signal by a threshold value $ABST_i$.

9. The method as defined in claim 8 wherein the step 8.1 includes 9.1 determining if any wheel deceleration has exceeded the deceleration threshold value $ABST_i$, then varying the rate of change of deceleration of the velocity command signal Wci by modifying the $ABSG_i$ gain factor increment such that $ABSG_i(n) = a_i + ABSG_i(n-1).$ 10. The method as defined in claim 9 including the step of 10.1 resuming the normal braking mode when $ABSG_i = 0$.

* * * * *